US012600050B2

(12) United States Patent
Mesika

(10) Patent No.: US 12,600,050 B2
(45) Date of Patent: Apr. 14, 2026

(54) SHAVING APPARATUS HAVING A RAZOR HANDLE FOR DISPOSABLE RAZOR CARTRIDGES

(71) Applicant: Yigal Mesika, Los Angeles, CA (US)

(72) Inventor: Yigal Mesika, Los Angeles, CA (US)

( * ) Notice: Subject to any disclaimer, the term of this patent is extended or adjusted under 35 U.S.C. 154(b) by 282 days.

(21) Appl. No.: 17/769,397

(22) PCT Filed: Oct. 16, 2019

(86) PCT No.: PCT/US2019/056448
§ 371 (c)(1),
(2) Date: Apr. 15, 2022

(87) PCT Pub. No.: WO2021/076116
PCT Pub. Date: Apr. 22, 2021

(65) Prior Publication Data

US 2024/0131737 A1 Apr. 25, 2024
US 2024/0227225 A9 Jul. 11, 2024

(51) Int. Cl.
*B26B 21/52* (2006.01)

(52) U.S. Cl.
CPC .................................. *B26B 21/521* (2013.01)

(58) Field of Classification Search
CPC .................... B26B 21/40; B26B 21/52; B26B 21/521-526
See application file for complete search history.

(56) References Cited

U.S. PATENT DOCUMENTS 3,740,841 A * 6/1973 Risher ...................... B26B 21/16 30/57
3,938,247 A * 2/1976 Carbonell ............. B26B 21/225 30/47
4,266,340 A * 5/1981 Bowman ............... B26B 21/225 30/47

(Continued)

FOREIGN PATENT DOCUMENTS

EP 2265422 6/2013
JP 2006-204669 8/2006

(Continued)

OTHER PUBLICATIONS

International Search Report and Written Opinion of the Intrnational Search Authority, PCT/US19/56448, Jul. 8, 2020.

*Primary Examiner* — Boyer D Ashley
*Assistant Examiner* — Richard D Crosby, Jr.
(74) *Attorney, Agent, or Firm* — RISSO I.P.

(57) ABSTRACT

Described is a shaving apparatus having a razor handle for disposable razor cartridges. The handle has a top side and a bottom side and both a proximal end and a distal end. A cartridge receiver assembly is positioned on the distal end of the handle and is configured to detachably attach with a removable razor cartridge. A release button is positioned on the bottom side of the handle and operably connected with the cartridge receiver assembly such that depression of the release button causes the cartridge receiver assembly to release a removable razor cartridge when attached with the cartridge receiver assembly. Further, the release button has an exterior surface such that the exterior surface of the release button is flush with the bottom side of the handle.

8 Claims, 4 Drawing Sheets

(56) References Cited

U.S. PATENT DOCUMENTS

| | | | | |
|---|---|---|---|---|
| 4,739,553 | A * | 4/1988 | Lazarchik | B26B 21/521 30/47 |
| 4,797,998 | A * | 1/1989 | Motta | B26B 21/225 30/530 |
| 5,157,834 | A * | 10/1992 | Chen | B26B 21/521 30/47 |
| 5,182,858 | A * | 2/1993 | Chen | B26B 21/521 30/49 |
| 5,333,383 | A * | 8/1994 | Ferraro | B26B 21/521 30/527 |
| 5,784,790 | A | 7/1998 | Carson et al. | |
| 6,305,084 | B1 | 10/2001 | Zucker | |
| 6,990,740 | B2 * | 1/2006 | Follo | B26B 21/521 30/527 |
| 7,152,512 | B1 * | 12/2006 | Prochaska | B26B 21/225 83/13 |
| 7,500,313 | B2 | 3/2009 | Fandrey et al. | |
| 7,690,122 | B2 * | 4/2010 | Worrick, III | B26B 21/405 30/526 |
| D722,197 | S | 2/2015 | Heimbold | |
| D745,215 | S | 12/2015 | Go | |
| D750,324 | S | 2/2016 | Bae | |
| D789,609 | S | 6/2017 | Kong | |
| 9,718,201 | B2 * | 8/2017 | Swenson | B26B 21/225 |
| 9,993,931 | B1 * | 6/2018 | Zucker | B26B 21/521 |
| 9,999,981 | B2 * | 6/2018 | Bunnell | B26B 21/521 |
| D843,060 | S | 3/2019 | Fyfield | |
| D857,991 | S | 8/2019 | Atlason | |
| 10,427,312 | B2 * | 10/2019 | Gratsias | B26B 21/521 |
| D887,082 | S | 6/2020 | Zaremba | |
| D903,943 | S | 12/2020 | Zaremba | |
| D911,608 | S | 2/2021 | Riehle | |
| D912,900 | S | 3/2021 | Avery | |
| 2003/0079348 | A1 | 5/2003 | Follo | |
| 2006/0080838 | A1 | 4/2006 | Johnson et al. | |
| 2007/0050995 | A1 * | 3/2007 | Schnak | B26B 21/526 30/526 |
| 2008/0034589 | A1 | 2/2008 | Nearing | |
| 2009/0056140 | A1 | 3/2009 | Bruno et al. | |
| 2009/0235539 | A1 * | 9/2009 | Wonderley | B26B 21/521 30/527 |
| 2015/0283716 | A1 | 10/2015 | Kim et al. | |
| 2015/0314465 | A1 | 11/2015 | Giannopoulos et al. | |
| 2017/0112002 | A1 | 4/2017 | Behrendt | |
| 2017/0326744 | A1 * | 11/2017 | Liberatore | B26B 21/4012 |
| 2017/0334083 | A1 | 11/2017 | Gratsias et al. | |
| 2020/0023531 | A1 * | 1/2020 | Hitchcock | B26B 21/225 |
| 2020/0070376 | A1 * | 3/2020 | Petratou | B26B 21/521 |
| 2021/0187769 | A1 * | 6/2021 | Kopelas | B26B 21/222 |

FOREIGN PATENT DOCUMENTS

| | | |
|---|---|---|
| WO | WO 2010/068077 | 6/2010 |
| WO | WO 2016/123599 | 8/2016 |
| WO | WO 2018/202847 | 11/2018 |

* cited by examiner

SHAVING APPARATUS HAVING A RAZOR HANDLE FOR DISPOSABLE RAZOR CARTRIDGES

CROSS-REFERENCE TO RELATED APPLICATIONS

This is a national stage application of PCT/US19/56448, filed on Oct. 16, 2019, the entirety of which is incorporated herein by reference.

BACKGROUND OF THE INVENTION

(1) Field of Invention

The present invention relates to a shaving apparatus and, more particularly, to a manual shaving device having a handle, such that the handle includes a release button positioned on a bottom side of the handle to allow a user to easily load or remove a disposable razor cartridge.

(2) Description of Related Art

The removal of facial and other body hair is typically accomplished using a variety of cutting or shaving tools. By way of example, shaving devices have been devised that that typically include a handle and an easily detachable and disposable razor cartridge. While some shaving devices require that the razor cartridge or head be hand removed by a user, others have been created that include a release button. Such a razor is traditionally formed with a release button that allows the cartridge to be easily removed from the razor. These traditional razors are built such that the button to remove the razor head or cartridge is located on the top of the razor handle. While easily placed for access, placement of the release button on the top of the razor handle creates other issues not addressed by current designs.

The placement of a trigger or release button on the top of the razor handle creates use and shaving issues. For example, shaving should be accomplished with a minimum amount of pressure. Because the release button is placed on the top side of the razor handle, the user inadvertently uses the release button as a grip point and, in doing so, applies additional pressure to a shaving surface when using the razor. Placing too much pressure on the skin while shaving can create skin irritations and bad skin exfoliations. Another dilemma is that long finger nails could get caught on the moveable trigger or release button mechanism, causing either too much pressure to be applied or causing the razor head to inadvertently eject or be released mid-shave.

Most traditional razor cartridges with disposable razor heads or cartridges have gaps between the cartridge and handle that provide just enough space for finger nails to snag. Thus, another issue with the prior art is that there is a gap between the handle and razor cartridge that allows a user's finger nail to get caught/snagged when a user is attempting to eject the razor handle while pressing a traditional trigger or button the top of the handle. This issue is not problematic with the relatively inexpensive disposable razors where the razor head itself is not detachable and the entire unit (handle and all) are disposed of after a few uses. While functional and cheap, such disposable razors have handles that are smooth along their entire length as they have no release button. This is desirable so as to not provide a space for a fingernail to snag when using the release button and also avoid providing a grip point for the finger which can inadvertently result in added and unnecessary pressure while shaving. However and as noted above, traditional razor cartridges with disposable razor heads or cartridges are designed away from such desirability (i.e., smooth handle) due to the need for a button release mechanism.

Further, elderly people or people with arthritis or weak hands often have trouble shaving with existing razors. For such people it can be difficult to pull a trigger, such as those on existing most razors with disposable cartridges. Thus, it would be easier for such users to press a button that is strategically placed to shoot the cartridge off effortlessly. Also, such users and others would benefit from a very intuitive button placement that requires no need for instructions.

Thus, a continuing need exists for a razor handle that includes the release button at a location that allows for ease of use, while limiting unintentional pressure during shaving and eliminating errant ejections.

SUMMARY OF INVENTION

This disclosure is directed to a shaving apparatus having a razor handle for disposable razor cartridges. The handle has a top side and a bottom side and both a proximal end and a distal end. A cartridge receiver assembly is positioned on the distal end of the handle and is configured to detachably attach with a removable razor cartridge. A release button is positioned on the bottom side of the handle and operably connected with the cartridge receiver assembly such that depression of the release button causes the cartridge receiver assembly to release a removable razor cartridge when attached with the cartridge receiver assembly.

In another aspect, a button housing is housed within the cartridge receiver assembly and connected with the release button to secure the release button to the handle.

In yet another aspect, a button spring is positioned against the release button to bias the release button away from the cartridge receiver assembly.

In another aspect, a razor cartridge attachment is formed on the button housing, the razor cartridge attachment being formed to lockingly engage with a razor cartridge connector formed on the razor cartridge.

In yet another aspect, an ejector is slidably positioned within the cartridge receiver assembly and biased outward by an ejector spring.

Further, the ejector has terminal ends that are shaped to wrap around the button housing and be positioned proximate the razor cartridge, whereby when the button is depressed, the button forces the button housing and associated razor cartridge attachment to release the razor cartridge connector, thereby allowing the terminal ends of the ejector to engage with and force the razor cartridge away from the cartridge receiver assembly and handle to eject/shoot the razor cartridge.

In another aspect, the release button has an exterior surface such that the exterior surface of the release button is flush with the bottom side of the handle.

Additionally, the top side of the handle has a length and is smooth along its entire length.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
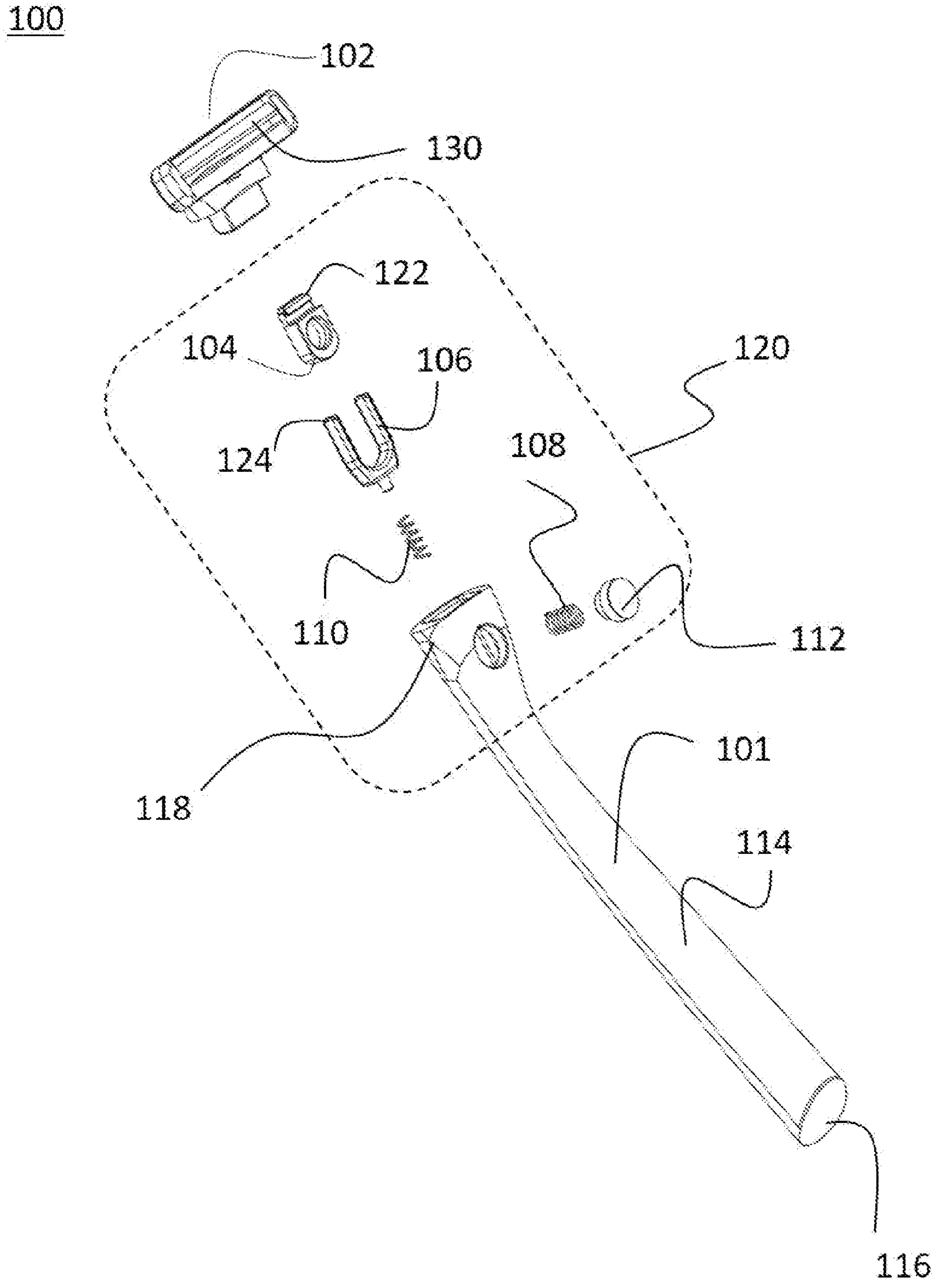
FIG. 1 is a bottom and elevated, exploded-view illustration of a shaving apparatus according to various embodiments of the present invention.

The present invention relates to a shaving apparatus and, more particularly, to a manual shaving device having a handle, such that the handle includes a release button positioned on a bottom side of the handle to allow a user to easily remove a disposable razor cartridge. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Specific Details

The present disclosure is directed to a shaving apparatus and, more particularly, to a shaving apparatus having a razor handle for disposable razor cartridges or blades. Notably, the blade removal mechanics are done by pressing a release button on the bottom side of the razor handle, which releases the used razor head in preparation for a new razor head. By placing the release button on the bottom side of the handle, it can easily be clicked with the pointer/index finger to cause ejection of the associated razor cartridge. The razor cartridge can also be removed by flipping the apparatus around and using a thumb to depress (press) or otherwise actuate the release button. Notably, another benefit is that the release button is not easily accidently pressed due to natural placement of the user's fingers (as opposed to the being positioned on the top as in the prior art). Further, because the release button is positioned on the bottom of the razor handle (as opposed to the top as in the prior art), a user does not inadvertently add additional pressure to the shaving surface while using the shaving apparatus. Thus, the configuration of the razor handle having the release button positioned on the bottom of the handle confers a marked improvement over the prior art.

Figure 2:
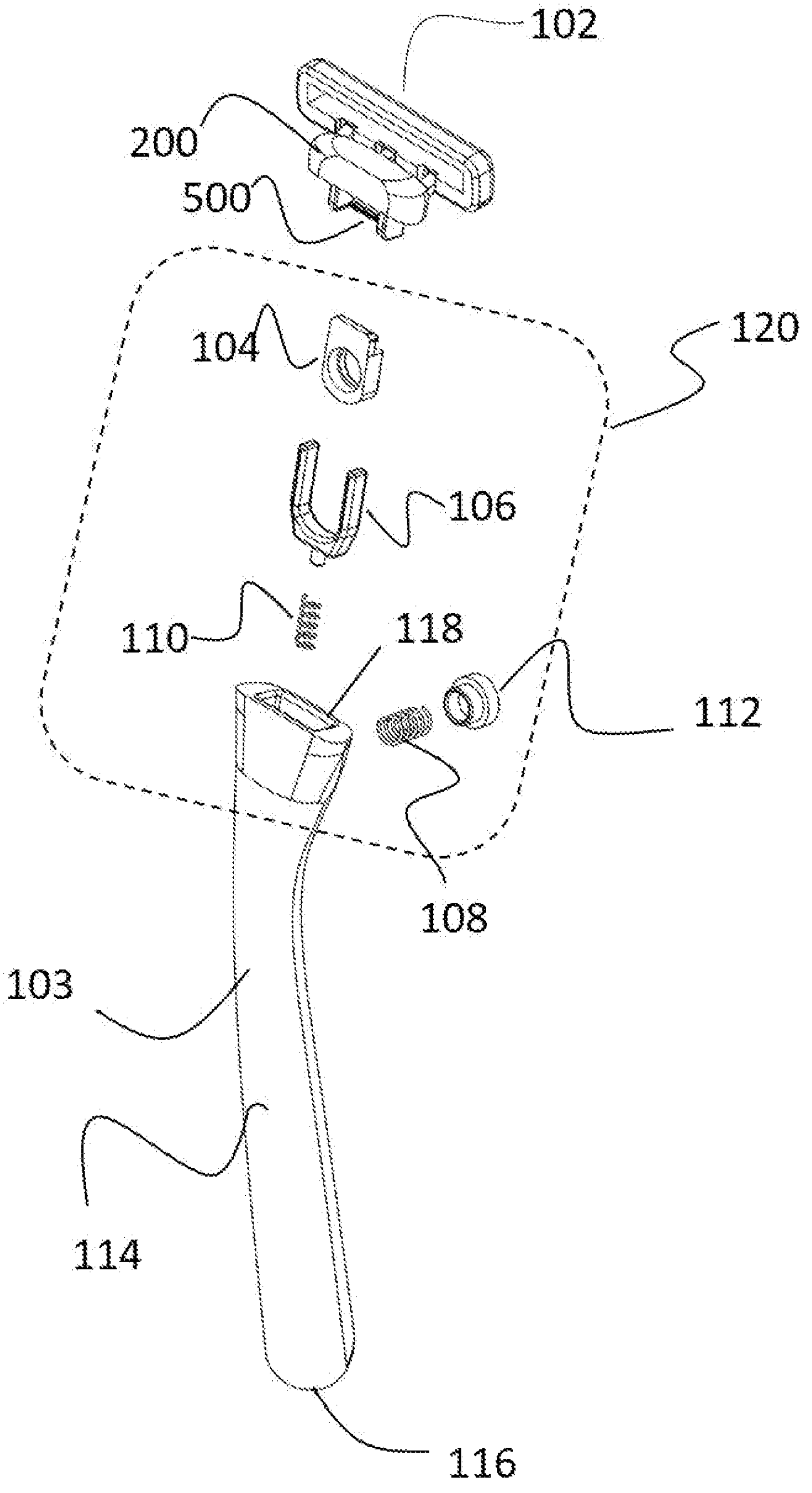
FIG. 2 is a top and elevated, exploded-view illustration of the shaving apparatus according to various embodiments of the present invention.

As noted above and as shown in the exploded-view illustrations of FIGS. 1 and 2, the present disclosure is directed to a shaving apparatus 100 having a razor handle 114. The razor handle 114 has both a bottom side 101 (shown in FIG. 1) and top side 103 (shown in FIG. 2). The bottom side 101 is defined as the side to which the razor blades are directed and that faces toward a shaving surface when in use (e.g., the user's face, legs, armpits, etc.). Alternatively, the top side 103 is opposite that of the bottom side 101 and faces away from the shaving surface.

The razor handle 114 is formed of any suitably stable material, non-limiting examples of which include stainless steel, aluminum, plastic, or any other suitably rigid and stable material. Notably, the handle 114 has a proximal end 116 and a distal end 118. The distal end 118 includes a cartridge receiver assembly 120 that is configured to detachably attach with a removable razor cartridge 102. The removable razor cartridge 102 is formed to house one or more blades 130 and detachably attach with the assembly 120. The razor cartridge 102 shows the option of desirably a single blade 130 razor; however, the invention is compatible with razor cartridges or heads having multiple blades.

As shown, the assembly 120 is formed such that the release button 112 (e.g., shaped as a button, etc.) for releasing the cartridge 102 is positioned on the bottom side 101 of the handle 114. The assembly 120 is formed using any suitable shape or mechanism that allows for detachable attachment with a razor cartridge 102. For example, the assembly includes a button housing 104 positioned within the assembly 120 for securely holding the release button 112 against the assembly 120. In one aspect, the release button 112 has a snap fit or press fit engagement with the button housing 104.

Positioned within the assembly 120 and against the release button 112 is a button spring 108. The button spring 108 forces the release button 112 outwards and biased away from the assembly 120. Although the release button 112 is depicted as a circular button, it should be noted that the release button 112 and button housing 104 can be any geometric shape or form to secure the release button 112 and to allow for the release of the razor cartridge 102. Further, a razor cartridge attachment 122 (such as a tab or click) is formed on the button housing 104. The razor cartridge attachment 122 serves to lockingly engage with a corresponding razor cartridge connector (depicted as element 500 in FIG. 5) formed on the razor cartridge 102.

An ejector 106 is slidably positioned within the assembly 120 and biased outward with a compressed ejector spring 110. The ejector 106 has terminal ends 124 that are shaped to wrap around (e.g., U-shaped) the button housing 104 and be positioned proximate the razor cartridge 102. When the razor cartridge 102 is connected with the handle 114, the razor cartridge connector is securely attached with the razor cartridge attachment 122. When the button 112 is depressed, it forces the button housing 104 and associated razor cartridge attachment 122 to release the razor cartridge connector. Because the ejector 106 is spring loaded, the terminal ends 124 of the ejector 106 are then free to engage with and force the razor cartridge 102 away (shoot off) from the assembly 120 and handle 114, thereby ejecting/shooting the razor cartridge 102 for replacement.

Figure 3:
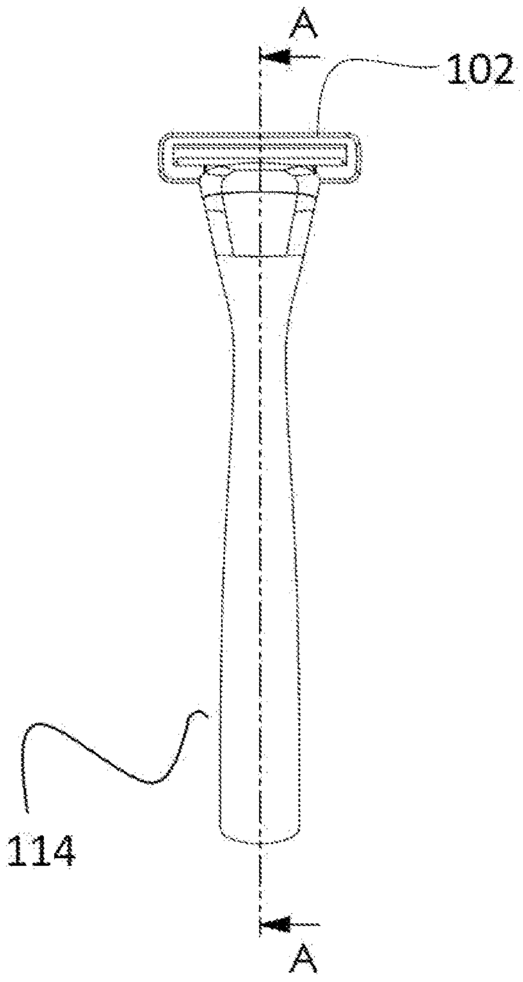
FIG. 3 is a top-view illustration of the shaving apparatus according to various embodiments.
Figure 4:
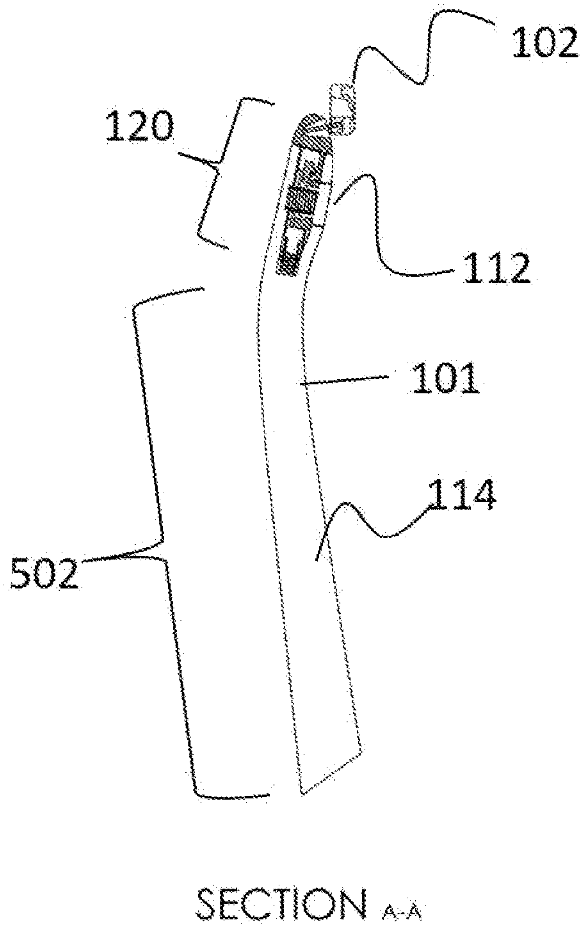
FIG. 4 is a side, cross-sectional view illustration of the shaving apparatus according to various embodiments.
Figure 5:
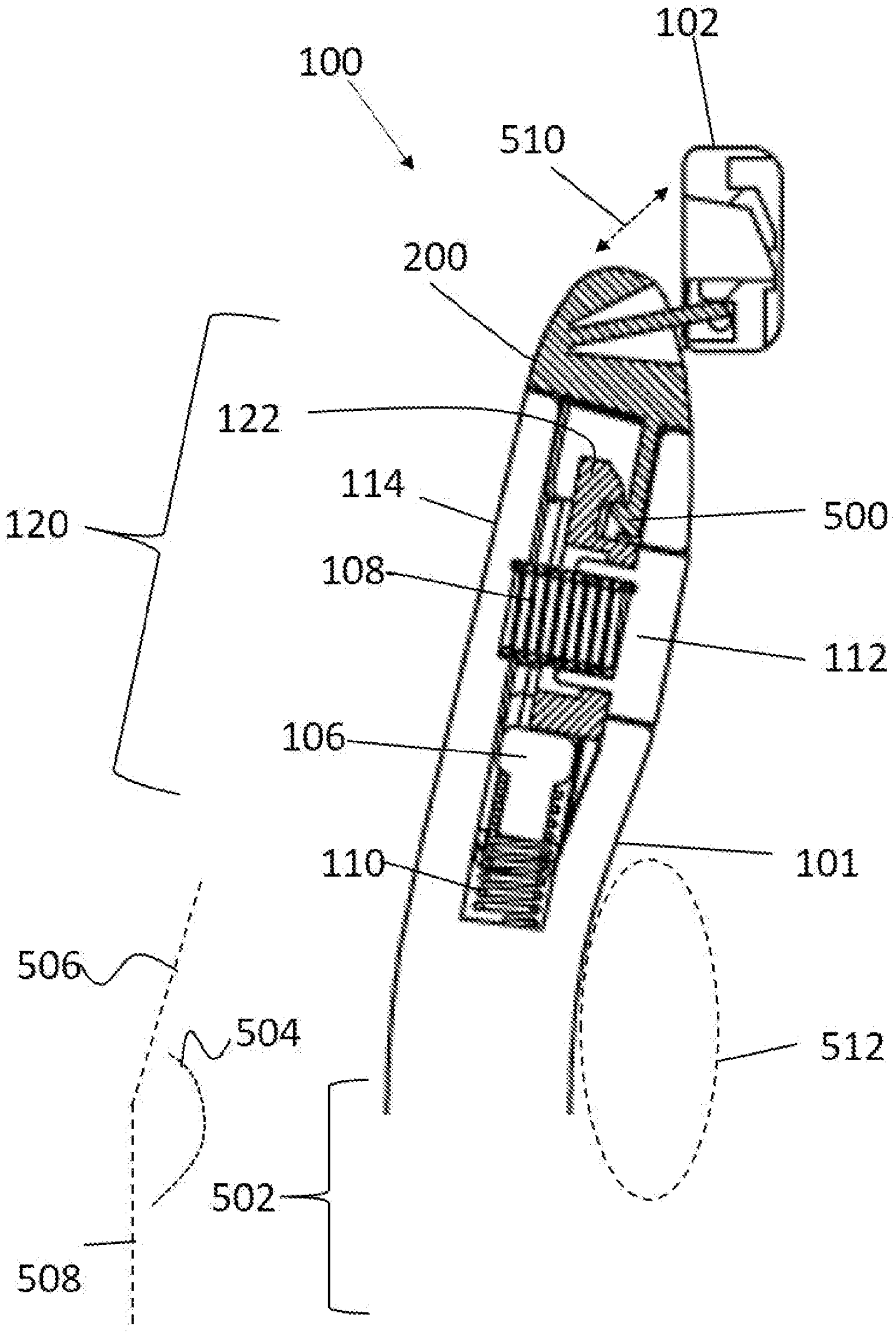
FIG. 5 is a close-up, cross-sectional, side-view illustration of the shaving apparatus according to various embodiments of the present invention.

For further understanding, FIG. 3 provide a top-view illustration of the handle 114, while FIG. 4 provides a cross-sectional, side-view illustration of the handle taken from line A-A of FIG. 3. FIG. 5 provides a close-up view of the cross-sectional side view as depicted in FIG. 4. Referring to FIG. 2, the razor cartridge 102 includes a cartridge base 200 having the razor cartridge connector 500 for sliding into and locking against the assembly 120. The close-up, cross-sectional view as shown in FIG. 5 depicts the base 200 and its razor cartridge connector 500 as being lockingly engaged with the assembly 120. Specifically, the razor cartridge connector 500 is latched with the razor cartridge attachment 122. Also shown is the release button 112 and a compressed button spring 108, and the ejector 106 and corresponding ejector spring 110. It should be noted that the device can also be formed without such an ejector 106 or ejector spring 110; meaning that the cartridge 102 can be manually removed by simply pressing the button 112 and pulling out the cartridge 102.

Although not required, the assembly 120 is desirably formed in the handle 114 at an angle 504 with respect to a holding portion 502 (also shown in FIG. 4) of the handle 114. The angle 504 between an assembly axis 506 and handle axis 508 is shaped to provide a hand space 512 for the user's hand while operating the shaving apparatus 100 and holding the shaving apparatus 100 proximate the user's skin.

In another aspect and as shown in FIGS. 2, 4, and 5, the assembly 120 and release button 112 are desirably formed such that an exterior surface of the release button 112 is flush with a bottom side 101 of the handle 114. This is advantageous as it prevents accidental depression of the release button 112 and also limits a grip point on the handle 114 that an operator may inadvertently use while shaving to add pressure to the blades (in the cartridge 102) during the shaving process. Although the release button 112 is described and illustrated as being flush, it should be understood that the present invention is not intended to be limited thereto as it can also be recessed or rise above the bottom surface 101. Further, the handle 114 can be formed in any suitable shape. Although not required, desirably, the top side of the handle 114 has a length and is formed such that the top side is smooth along its entire length. The length or size of the handle 114 can be designed/modified as desired and is not limited to any particular size or length. A smooth top-side surface eliminates a grip point (as in the prior art) for the user's fingers that allows a user to inadvertently apply unnecessary pressure to the shaving surface.

As noted above, razors of the prior art have a gap between the handle and razor cartridge that allows a user's finger nail to get caught/snagged when a user is attempting to eject the razor handle while pressing a traditional trigger on the top of the handle. Alternatively and in one aspect as shown in FIG. 5, the present invention holds the razor cartridge 102 in such a manner such that the razor cartridge 102 tilts away from the top side of the handle 114 and base 200 to provide a sufficiently large space 510. The space 510 is large enough such that it does not allow a user's finger nail to easily get caught within the space 510. Although most certainly not limited thereto, a non-limiting example of the space 510 is between 1 millimeters and 10 millimeters, and desirably between 2 millimeters and 5 millimeters.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A shaving apparatus, comprising:

a handle, the handle having a top side and a bottom side and both a proximal end and a distal end;

a cartridge receiver assembly positioned on the distal end of the handle, the cartridge receiver assembly having a razor cartridge attachment that is configured to detachably attach with a removable razor cartridge having one or more razor blades;

wherein the proximal end of the handle forms a holding portion adjacent to the cartridge receiver assembly, such that an assembly axis passes through the cartridge receiver assembly and a handle axis passes through the holding portion, with the handle being angled such that an obtuse angle is formed by the assembly axis and handle axis; and a depressible release button slidably positioned on the bottom side of the handle such that both the depressible release button and the one or more razor blades of the removable razor cartridge, when attached, face the obtuse angle, with the depressible release button being operably connected with the razor cartridge attachment such that depression of the depressible release button causes the cartridge receiver assembly to release a removable razor cartridge when attached with the cartridge receiver assembly;

a U-shaped ejector having prongs that end in terminal ends, the ejector being slidably positioned within the cartridge receiver assembly and biased outward by an ejector spring in a release direction; and a button housing slidably housed within the cartridge receiver assembly and connected with the depressible release button to secure the depressible release button to the handle, the button housing having the razor cartridge attachment that is shaped to lockingly engage with a razor cartridge connector formed on the razor cartridge such that depressing the depressible release button causes the razor cartridge attachment to disengage and release the razor cartridge connector, and wherein the prongs of the U-shaped ejector wrap around the button housing such that the terminal ends rest against the razor cartridge, and wherein upon release of the razor cartridge connector, the U-shaped ejector is forced outward with the terminal ends pushing the razor cartridge from the handle in the release direction, thereby ejecting the razor cartridge.

2. The shaving apparatus as set forth in claim 1, wherein the top side of the handle has a length and is smooth along its entire length.

3. The shaving apparatus as set forth in claim 1, wherein the depressible release button has an exterior surface defined by a button plane that passes along a length of the exterior surface, the exterior surface being flush with the bottom side of the handle.

4. The shaving apparatus as set forth in claim 1, wherein the top side of the handle is convex and the bottom side of the handle is concave.

5. The shaving apparatus as set forth in claim 1, wherein the depressible release button is slidably positioned on the bottom side of the handle such that it is depressible in a depress direction, and wherein the cartridge receiver assembly is configured to detachably attach with a removable razor cartridge such that when detached, the removable razor cartridge is released from the handle in a release direction, with release direction being orthogonal to the depress direction.

6. The shaving apparatus as set forth in claim 1, wherein the depressible release button is slidably positioned on the bottom side of the handle such that it is depressible in a depress direction, such that upon depressing the depressible release button, the button housing slides in the depress direction between the prongs of the U-shaped ejector.

7. The shaving apparatus as set forth in claim 6, wherein the depress direction is orthogonal to the release direction.

8. The shaving apparatus as set forth in claim 1, further comprising a button spring attached to the depressible release button, the button spring biasing both the button housing and depressible release button toward the obtuse angle.

* * * * *